(12) United States Patent
Qiu et al.

(10) Patent No.: US 9,276,858 B2
(45) Date of Patent: *Mar. 1, 2016

(54) METHOD AND APPARATUS FOR MITIGATING AN OVERLOAD IN A NETWORK

(71) Applicant: AT&T Intellectual Property I, L.P., Atlanta, GA (US)

(72) Inventors: Chaoxin Qiu, Austin, TX (US); Arshad Khan, Austin, TX (US); Jeffrey L. Scruggs, Round Rock, TX (US); Robert F. Dailey, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 268 days.

This patent is subject to a terminal disclaimer.

(21) Appl. No.: 13/947,981

(22) Filed: Jul. 22, 2013

(65) Prior Publication Data

US 2013/0308452 A1    Nov. 21, 2013

Related U.S. Application Data

(63) Continuation of application No. 12/772,939, filed on May 3, 2010, now Pat. No. 8,495,205.

(51) Int. Cl.

| | |
|---|---|
| *G06F 15/173* | (2006.01) |
| *H04L 12/801* | (2013.01) |
| *H04L 12/26* | (2006.01) |
| *H04L 29/06* | (2006.01) |

(52) U.S. Cl.
CPC ............ *H04L 47/12* (2013.01); *H04L 43/0882* (2013.01); *H04L 65/605* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 6,215,768 B1 | 4/2001 | Kim | |
| 7,065,057 B2 | 6/2006 | Lucioni et al. | |
| 7,808,918 B2 | 10/2010 | Bugenhagen | |
| 2002/0083175 A1* | 6/2002 | Afek et al. | 709/225 |
| 2004/0153545 A1* | 8/2004 | Pandya et al. | 709/226 |
| 2008/0005156 A1 | 1/2008 | Edwards et al. | |
| 2008/0049630 A1 | 2/2008 | Kozisek et al. | |
| 2009/0245129 A1 | 10/2009 | Pongracz et al. | |
| 2010/0274893 A1* | 10/2010 | Abdelal et al. | 709/224 |

* cited by examiner

*Primary Examiner* — Mohamed Ibrahim

(57) ABSTRACT

A method and apparatus for managing an overload condition in a network are disclosed. For example, the method monitors the network for a traffic overload condition, and determines whether a more severe traffic overload condition or a less severe traffic overload condition is detected by using a network monitor and controller. The method then selects using a network monitor and controller agent in response to a command from the network monitor and controller, a different bandwidth preservation scheme if the more severe traffic overload condition or the less severe traffic overload condition is detected, wherein the different bandwidth preservation scheme is based on a selection of a codec type and is applied to a portion of the traffic.

20 Claims, 6 Drawing Sheets

METHOD AND APPARATUS FOR MITIGATING AN OVERLOAD IN A NETWORK

This application is a continuation of U.S. patent application Ser. No. 12/772,939, filed May 3, 2010, now U.S. Pat. No. 8,495,205, and is herein incorporated by reference in its entirety.

The present disclosure relates generally to communication networks and, more particularly, to a method and apparatus for mitigating an overload in a packet network, e.g., an Internet Protocol (IP) network.

BACKGROUND

A large scale service provider network, e.g., a Next Generation Network (NGN), typically consists of multiple regional access offices and server offices connected to a backbone network, e.g., via uplinks between pairs of provider edge (PE) and customer edge (CE) routers. NGN access offices can be deployed with session border controllers (S/BC) to provide secured access by user endpoint devices (UEs) from public accesses and PSTN media gateways (MGW) for connectivity with Time Division Multiplexing (TDM) based telephony networks. Server offices can be deployed with call servers such as Call Session Control Functions (CSCF), Home Subscriber System (HSS), various application servers, media gateway control functions (MGCF), etc.

Public networks provide connectivity from UE to the public interfaces of S/BC. An NGN operator's internal backbone network provides inter-connectivity for communications of all other network elements. Some part of these networks may have more limited transport resources than others. For example, the link bandwidth between PE and CE routers for access offices are crucial network resources for providing the NGN services to its subscribers.

NGN operators may size the link capacity based on the forecast subscriber number, bandwidth per call, various historical call volume parameters, and so on. However, some situations may cause dramatic increase of call volumes. For example, events such as natural disasters, e.g., earthquakes, can trigger massive calling events. Since it is not possible to deploy additional transport resources on the fly, the existing network resources can be overloaded, thereby compromising the service capability of the NGN network.

In addition to the massive calling events, a NGN is often designed with geographical redundancy. Subscribers who are normally homed at one access office or data center can be re-homed to another access office or data center if their home office is out of service. This event will also cause a dramatic increase of workload and traffic in the protection site.

SUMMARY OF THE DISCLOSURE

In one embodiment, the present disclosure describes a method and apparatus for managing an overload condition in a network. For example, the method monitors the network for a traffic overload condition, and determines whether a more severe traffic overload condition or a less severe traffic overload condition is detected by using a network monitor and controller. The method then selects using a network monitor and controller agent in response to a command from the network monitor and controller, a different bandwidth preservation scheme if the more severe traffic overload condition or the less severe traffic overload condition is detected, wherein the different bandwidth preservation scheme is based on a selection of a codec type and is applied to a portion of the traffic.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for mitigating an overload in a network. Although the present disclosure is discussed below in the context of an IP Multimedia Subsystem (IMS) Network, the teachings of the present disclosure are not so limited. Namely, the teachings of the present disclosure can be applied to other packet networks, e.g., Voice over Internet Protocol (VoIP) networks and the like.

Figure 1:
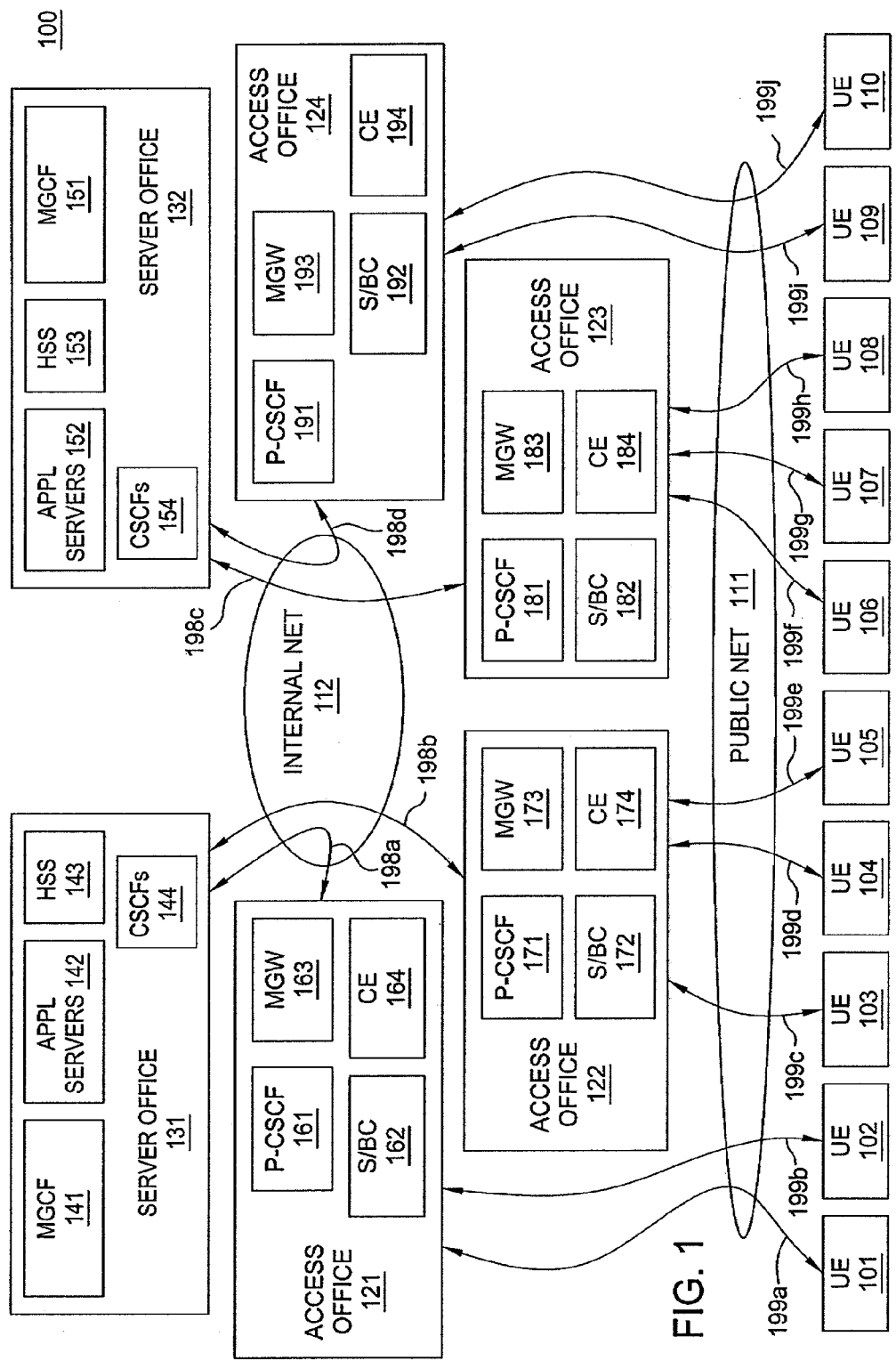
FIG. 1 illustrates an NGN network related to the present disclosure.

FIG. 1 illustrates an exemplary next generation network (NGN) 100 related to the current disclosure. In one embodiment, the NGN 100 comprises access offices 121-124, server offices 131 and 132, a public network 111 and an internal network 112. It should be noted that the number of access offices and server offices illustrated in FIG. 1 is only illustrative.

Network addresses (e.g., router addresses) within the internal network 112 are reachable using routing information available only within the service provider's network. The public network 111 comprises the network portion reachable using routing information (e.g., IP addresses) available in the public domain. Connections through the public network 111 are referred to as public connections. Connections through the internal network 112 are referred to as internal connections. Specifically, connections 199a through 199j are public connections. Connections 198a through 198d are internal connections.

Server offices are used for hosting various network devices such as Media Gateway Control Functions (MGCFs), Application Servers (ASs), Home Subscriber Servers (HSSs), Call Session Control Functions (CSCFs), etc. For example, server office 131 may host MGCF 141, Application Server 142, HSS 143 and CSCF 144. Similarly, server office 132 may host MGCF 151, Application Server 152, HSS 153 and CSCF 154.

Access offices are used for hosting network devices such as Proxy-Call Session Controller Functions (P-CSCFs), Session Border Controllers (S/BCs), Media Gateways (MGWs), Customer Edge (CE) routers, etc. in a distributed manner. For example, access office 121 may host P-CSCF 161, S/BC 162, MGW 163 and CE router 164, and whereas access office 122 may host P-CSCF 171, S/BC 172, MGW 173 and CE 174. Similarly, access office 123 may host P-CSCF 181, S/BC 182, MGW 183 and CE 184, and whereas access office 124 may host P-CSCF 191, S/BC 192, MGW 193 and CE 194. It should be noted that an access office may host any number of media gateways, P-CSCFs, S/BCs, CEs, and so on. In addition, the number and type of devices hosted at each access office may be different.

In one embodiment, each access office 121-124 is connected to an IP backbone network over both public and internal connections. For example, packets from IP UEs 101-110 reach an access office 121, 122, 123 or 124 via the public network 111. For example, UE 101 may send registration requests to S/BC 162 in the access office 121 via public connection 199a. Similarly, each of the UEs 102-110 may send registration requests to S/BC 162, 172, 182 or 192, respectively via a public connection through the public network 111.

In one embodiment, the Session Border Controllers (S/BCs) are used to enable IP UEs to connect to the NGN 100 and obtain services. For example, a UE may register to the NGN via a particular S/BC to receive VoIP services. Each S/BC bridges between the public network 111 and the internal network 112. Once a UE registers to the NGN via a particular S/BC, calls to/from the UE flow through the particular S/BC through which the UE is registered. The particular S/BC performs the bridging of the call between the public and internal networks.

In one embodiment, the MGWs are used to support calls between IP based UEs and TDM based PSTN phones. Calls to or from a PTSN phone use a particular trunk group on a particular MGW, depending on the PSTN number. The PSTN number refers to a phone number. For example, in phone numbers derived from the North American Numbering Plan (NANP), the phone number is a 10 digit number. The area code is the first three digits, and is also referred to as a Number Plan Area (NPA) code. The term NPA.NXX refers to the first six digits of a phone number containing the NPA code and a three digit exchange number following the NPA code. Calls to and from a particular NPA.NXX may be routed via a particular trunk group on a particular MGW.

Figure 2:
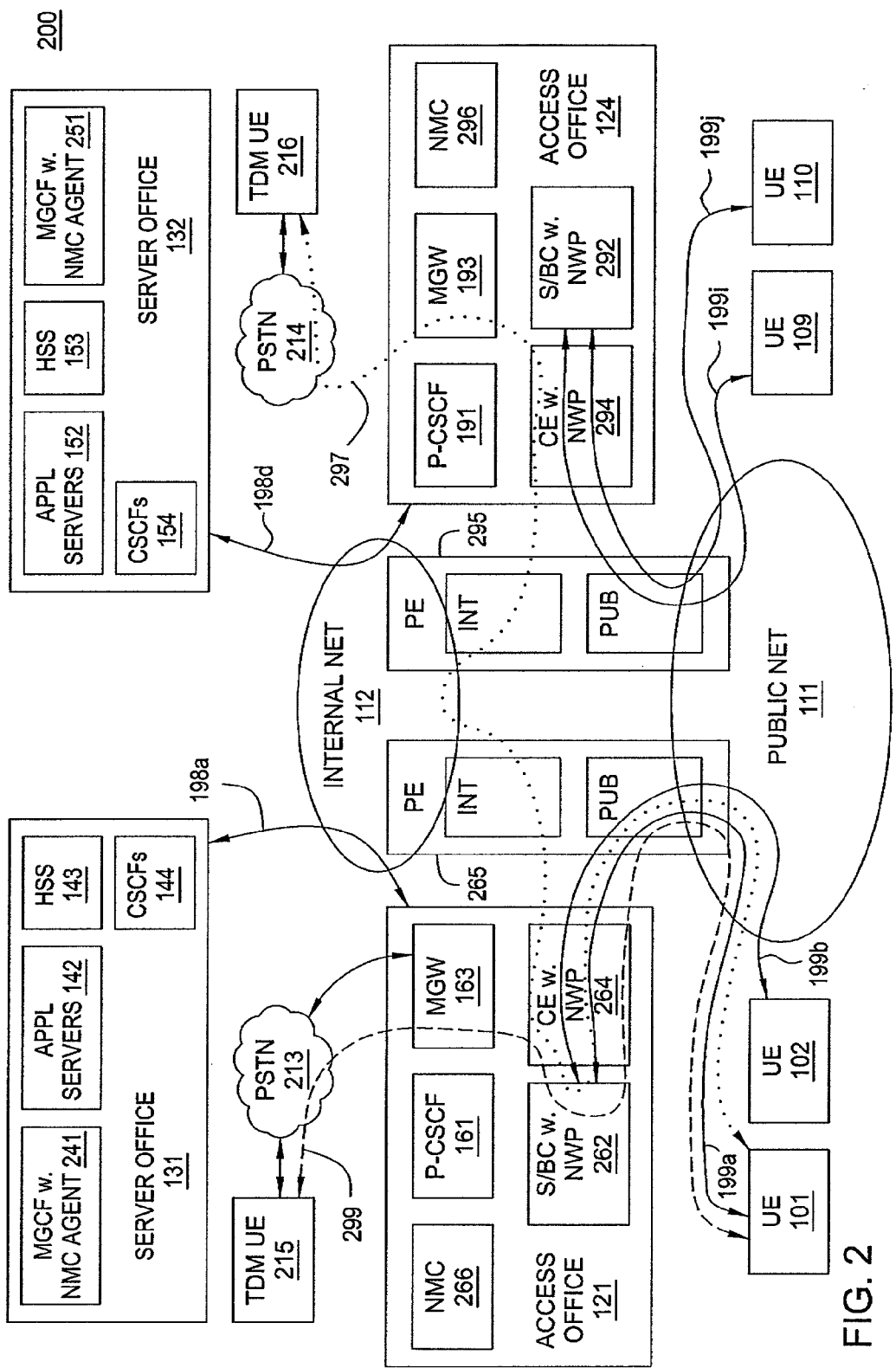
FIG. 2 illustrates an exemplary network related to the present disclosure for mitigating an overload in a network.

FIG. 2 illustrates an exemplary network 200 for mitigating an overload in a network. The network 200 comprises access offices 121 and 124, server offices 131 and 132, a public network 111, an internal network 112, Public Switched Telephone Networks (PSTNs) 213 and 214. For example, a TDM UE 215 reaches the access office 121 via the PSTN 213. Similarly, a TDM UE 216 reaches the access office 124 via the PSTN 214. It should be noted that this description pertains only to the media path for an active call session. Furthermore, it should be noted that this is an illustrative network configuration in which there is a difference between access offices and server offices. However, other NGN operator may choose to deploy differently by dividing the NGN into many regional offices where the server office equipments and access office equipments are combined together. Thus, the present disclosure is not limited in the manner the access offices and server offices are illustrated.

In one embodiment, the current method teaches mitigating an overload in a network by controlling and/or changing a type of codec used for calls. In one embodiment, the method first identifies network transport nodes that function as critical gateways, e.g., CEs, PEs, S/BCs, etc. The method may then deploy one or more Network Watch Points (NWPs) and Network Monitor and Controllers (NMCs), as described below.

In one embodiment, the network 200 comprises a Network Monitor and Controller in each access office. The network 200 also comprises NMC agents deployed in MGCFs in the server offices throughout the NGN. The network 200 also comprises one or more Network Watch Points or modules, at various points of an NGN network, e.g., PE routers or CE routers, or S/BCs of an NGN. The functions of the NMCs and NWPs will be described below.

In one embodiment, an NWP refers to a module in a network device that is used for determining when a bandwidth usage in a node either reaches or exceeds a predetermined threshold. In turn, the NWP may also be used to alert the NMC when the bandwidth usage has either reached or exceeded the predetermined threshold. For example, the method may deploy an NWP at each of the identified CE, PE or S/BC nodes.

In one embodiment, an NMC refers to a network device or a module that is used for gathering alerts from the NWPs and for controlling network traffic volumes. The NMC comprises at least a policy rule engine for determining one or more actions for controlling traffic load. For example, the policy rule engine may decide when to force the use of a lower bandwidth coder/decoder (codec) on new calls, when to use a midcalf procedure to change codecs for existing calls, and when to stop enforcing the use of the lower bandwidth codec, as described below.

In one embodiment, the NMC may operate with the NMC agents implemented in various Media Gateway Controller (MGC) functions. That is, software modules which function as NMC agents may be implemented in MGC functions. The NMC may then interface with the NMC agents in one or more MGCFs to control traffic load, i.e., to take appropriate actions upon receiving commands from the NMC, as discussed further below.

In one example, an NWP in a node may determine that the bandwidth usage for the node, e.g., a CE, a PE, a S/BC and the like, has exceeded a predetermined threshold, e.g., 90% of capacity, 80% of capacity, and so on. The NWP will then alert the NMC that the threshold has been reached or exceeded. The NMC gathers the alerts and then activates one or more steps of the current disclosure to control the traffic load by controlling and/or changing a type of codec used for calls. It should be noted that any description pertaining to numerical values in the present disclosure, e.g., a particular threshold value, is only illustrative. The scope of the present disclosure is not limited to any particular numerical values, and the present disclosure can be adapted to meet the requirements of a particular implementation.

In one embodiment, e.g., in a distributed implementation, there is one NMC in each access office. Each NMC receives reports from the NWPs for various network resources supporting that particular access office. When it detects any surges of network resource usage from one or more NWPs, the NMC may send a command to one or more NMC agents deployed in various MGCFs throughout the network such that the one or more MGCFs may take appropriate action to control traffic to address an overload condition. For example, if the NMC in an access office receives a surge of network usage from one or more NWPs for a specific rate center served by the particular access office (e.g., as identified by an NPA of NPA-XXX code), the NMC may send a command to the NMC agents in the MGCFs to control traffic load by using a codec that requires a lower bandwidth. The various MGCFs may then continue to support calls using a codec with a lower bandwidth in accordance with the command received from the NMC.

For example, voice data transmission using a standard International Telecommunications Union (ITU) G.711 codec may have a codec bit rate of 64 Kbps, while voice data transmission using an ITU G.728 codec may have a bit rate of 16 Kbps. The present method may then lower the bandwidth needs to support each call by up to a factor of four by changing from a G.711 codec to a G.728 codec as an example. It should be noted that this is only one illustrative example. The present disclosure is not limited to any particular types of codecs.

In one embodiment, the commands sent by the NMC to the NMC agents in the MGCFs to control traffic load may vary based on a threshold that is reached. For example, there may be a plurality of threshold levels (broadly referred to as overload condition severity levels) such as "green", "yellow", "orange", "red", etc.

For example, the threshold associated with the green level may indicate that there is no overload condition. If a command to use a lower bandwidth codec was previously issued, the NMC may send another command to the NMC agents to terminate enforcing the previously issued commands, i.e., stop enforcing the use of a lower bandwidth codec. If there was no previously issued command, i.e., while the network condition is still at the green level, the NMC simply continues the monitoring.

The threshold associated with the yellow level may indicate that an overload condition has been detected. In response, the NMC will issue a command to enforce the usage of a lower bandwidth codec only for new calls. For example, existing calls (calls in progress) may continue to use the codec selected when the call was established, while new calls will be supported using a codec with lower bandwidth. In other words, ongoing calls will not be affected with the codec change at this level.

The threshold associated with the orange level may indicate that a more severe overload condition has been detected. In response, the NMC will again issue a command to enforce the usage of a lower bandwidth codec. For example, the NMC may issue a command to initiate mid-call procedures to change existing calls to a lower bandwidth codec. In other words, not only new calls will use the lower bandwidth codec, but even existing calls will use the lower bandwidth codec. For example, the method may use existing Session Initiation Protocol (SIP) mid-call control procedures to change the type of codec for calls that are already in progress. For example, SIP provides mid-call changes such as, adding another endpoint to a conference, modifying a media characteristic, modifying a codec, and so on. The method may then invoke a SIP mid-call control procedure to initiate usage of a codec with a lower bandwidth for all existing calls.

In one embodiment, the red level may indicate that a very severe overload condition has been detected. However, unlike the yellow level and orange level, the red level may indicate that the overload condition is so severe that changing the codec type may not adequately address the overload condition. In response, the NMC will issue a command to execute other overload correction procedures, e.g., taking other corrective actions that do not involve changing the codec type. For example, other methods of reducing traffic including but not limited to throttling, blocking, etc. may be used. Thus, the present disclosure provides a method of addressing traffic overload in a network in a scalable manner with a plurality of different actions that will alter the type of codecs that are being used to address the particular overload condition that is being detected. This approach will allow the network to dynamically respond to overload conditions very quickly in a cost effective way. It allows the NGN network to be more adaptive to the network condition in a dynamic manner. The NGN network implementing this method can support maximal possible call sessions under overload conditions that may be caused by mass calling events, office failover, etc.

It should be noted that the number of threshold levels and color codes is only exemplary. As such, the teachings of the current method are not intended to be limited to these exemplary implementations.

Returning to the exemplary network 200, server office 131 may host MGCF with NMC agent 241, Application Server 142, HSS 143 and CSCF 144, whereas server office 132 may host MGCF with NMC agent 251, Application Server 152, HSS 153 and CSCF 154. Access office 121 may host P-CSCF 161, S/BC with NWP 262, MGW 163, CE router with NWP 264 and an NMC 266. Access office 124 may host P-CSCF 191, S/BC with NWP 292, MGW 193, CE router with NWP 294 and NMC 296. It should be noted that an access office may host any number of media gateways, P-CSCFs, S/BCs, CEs and so on. In addition, the number and type of devices hosted at each access office may be different. Each of the access offices 121 and 124 is connected to an IP backbone network over both public and internal connections.

For example, CE router 264 is connected to the public connections on a PE router 265 over a public link, and to internal connections on the PE router 265 over an internal link. Similarly, CE router 294 is connected to public connections on PE router 295 over a public link, and to internal connections on the PE router 295 over an internal link. It should be noted that the separation of the PEs between internal network and the public network is just a logical illustration. In one embodiment, the PEs could physically be a single backbone router.

Packets from IP UEs 101 and 102 reach the access office 121 via the public network 111. For example, UE 101 may register to the NGN via S/BC 262 in access office 121. Packets from UE 101 may then reach the S/BC 262 in the access office 121 via the public connection 199a. Similarly, UE 110 may register to the NGN via S/BC 292 in the access office 124. Packets from UE 110 may then reach the S/BC 292 in the access office 124 via the public connection 199j.

As discussed above, there are many causes that may trigger a sudden increase of the resource consumption in a part or all of an NGN network. Mass calling events, such as those triggered by a natural disaster or national security crisis, are one of the examples. Another example is the situation referred to as access office failover.

To illustrate, if a call is between an IP based UE and a TDM based PSTN phone, then the call is handled by the S/BC at which the UE is registered and the MGW handling calls to/from the PSTN phones for the specific area code, i.e., NPA.NXX code. If the S/BC and the MGW for a call are collocated in the same access office, then the call traverses the link between the PE router and the CE router once. If the S/BC and the MGW for a call are located in different access offices, then the call traverses the link between the PE router and CE router in the access office with the S/BC twice and the link between the PE router and CE router in the access office with the MGW once.

In one example, a call is originated by UE 101 registered via S/BC 262. The call is destined to a PSTN phone 215 and MGW 163 provides trunk group to the PSTN switch serving the rate center (NPA.NXX) for the PSTN phone 215. A bearer path 299 illustrates the media flow traversed by audio packets to/from UE 101 and PSTN phone 215. The media flow originated by UE 101 traverses PE 265 and CE 264 to reach S/BC 262. S/BC 262 bridges the media flow to the internal network and forwards the media flow to MGW 163 via CE 264. The MGW 163 may then forward the media flow to the PSTN phone 215 via the PSTN 213. It should be noted that on the same call session between the two parties, there is another media flow in the opposite direction directed towards the UE101.

In another example, a call is originated by UE 101 registered via S/BC 262. The call is destined to a PSTN phone 216 and MGW 193 provides trunk group to the PSTN switch serving the rate center (NPA.NXX) for the PSTN phone 216. A bearer path 297 illustrates the media flow traversed by audio packets to/from UE 101 and PSTN phone 216.

As illustrated in the above example, when the S/BC and MGW for a call are in different access offices, twice as much bandwidth is required in the access office with the S/BC, as compared to the bandwidth required when the S/BC and MGW are collocated. General phone call statistics shows that the majority of phone calls are local calls. Accordingly, network service providers may design their access offices by placing S/BCs and MGWs such that the majority of calls between IP based UEs and TDM based PSTN phones have bearer path traversing through collocated S/BCs and MGWs. Thus, the network can be designed to handle a smaller fraction of calls bearer path traversing an S/BC and an MGW in different access offices. For example, the network may handle only 10% of calls have bearer path traversing an S/BC and an MGW in different access offices.

However, if a UE is unable to register with the S/BC that normally provides services to the UE or it loses connectivity with that S/BC, then the UE may register at another S/BC and continue accessing services. The re-registering via another S/BC is referred to as access office failover. When a UE re-registers via another S/BC, the UE is referred to as "re-homed" at another S/BC. The re-homed UEs may continue originating and receiving calls to/from the PSTN phones using the MGW and S/BC in different access offices. For example, if the UE was typically calling PSTN phones in area code 212 and the MGW handling area code 212 was located in the same access office as the S/BC at which the UE was normally registered, after failing over by registering via another S/BC located at another access office, the UE typically will continue to call phone numbers in the same area code 212. The majority of calls bearer path to/from re-homed UEs will flow via the new S/BC and an MGW located in different access offices. The functions of the MGW are retained in the original access office.

A service provider may enable an access office to serve as a designated protection site for another access office. For example, a first access office may have a second access office as its designated protection site. If a network failure affects the first access office, customers who typically access the first access office may utilize the second access office. However, in some failure scenarios, the public network connection to an access office may be affected by a failure while the internal portion is functioning normally. A large number of UEs may then fail over (and are re-homed) to a protection site, thereby resulting in an access office failover event. An access office failover event refers to a network event in which a large number or percentage of UEs that previously were registered at one or more S/BCs in a first access office, suddenly re-register at one or more S/BCs located at an access office serving as a protection site for the first access office.

As discussed above, the majority of PSTN calls to/from the re-homed UEs are likely from/to area codes currently serviced by the MGW in UE's original home access office. Since these calls require more bandwidth at the re-homed access office, an access office failover event may result in the network being overloaded, or performance being degraded for all calls. For example, calls that are normally handled by the protection site may experience increased delay, packet loss, etc.

In one embodiment, the present method initiates usage of a codec for re-homed calls, wherein the codec uses a lower bandwidth. For example, if the threshold for usage of bandwidth is exceeded for a second access office that serves as a protection site for a first access office, the method may initiate usage of a codec with lower bandwidth only for the calls that are re-homed from the first access office. The usage of the codec with lower bandwidth for re-homed calls may be applied on new calls, existing calls, or both.

In one embodiment, the processes performed by the NMCs may be implemented at a centralized location, e.g., a national data center, a server office or an operation center. The centralized implementation is capable of providing the same functions as discussed above in the distributed implementation. However, in order to be able to handle events that may occur in some particular areas that causes network overload in some particular access offices, the NMC can be implemented with a map that shows which NPA (or NPA-NXX) codes will be impacted if a particular NWP reports network resource issues. The mapping of the NWP to NPA or NPA-NXX codes can be provisioned via NMC configuration interfaces and can be stored within the NMC.

In one embodiment, the method may provide a plurality of thresholds for invoking usage of a codec with a lower bandwidth for various types of traffic. For example, different thresholds can be set for invoking the usage of lower bandwidth on all calls, only for re-homed calls, only for new calls, and so on. That is, the conservation of bandwidth may be applied based on new calls versus existing calls, re-homed traffic versus traffic from the same access office, or any combination thereof.

In one embodiment, the method is also able to detect that the call volume and/or traffic load has dropped to or below a predetermined threshold. For example, the method may detect that a node is operating only at 50% of capacity. Upon detecting the available capacity, the method may then discontinue the usage of the codec with the lower bandwidth. That is, the method may stop bandwidth conservation and enable usage of other codec standards. For the above example, existing and/or new calls may begin or return to using the G.711 codec to achieve better voice quality.

In one embodiment, the predetermined threshold for initiating usage of a codec with a lower bandwidth and the predetermined threshold for termination of the usage of the codec with the lower bandwidth may be different. For example, the method may initiate usage of a codec with a lower bandwidth when the node reaches 90% of capacity, whereas the node will return to another codec (e.g., a higher bandwidth codec) when the node falls below 70% of capacity. Another variation to this embodiment is where the method will only take the orange level action as discussed above after receiving "N" consecutive orange alerts from the NWPs in "M" seconds, otherwise continues to act as if receiving yellow alert. Similarly, the method will only take green level action after "K" seconds has elapsed since receiving the green alert from all NWPs in the same access office without receiving other new yellow or orange alerts. These approaches will provide more stability in that the method is not too sensitive to transient network conditions.

In another embodiment, the same threshold may be used. For example, the method may initiate usage of a codec with a lower bandwidth when the node is operating at or above 80% of capacity and it will return to another codec (e.g., a higher bandwidth codec) when the node falls below 80% of capacity.

In one embodiment, the method for mitigating an overload can be implemented with redundancy. For example, the method may deploy redundant NMCs, wherein the redundancy provides one primary NMC and at least one backup NMC. For example, a network condition, e.g., a failure or degradation, may affect the availability of the primary NMC. The method may then enable one of a plurality of backup NMCs to gather alerts from the NWPs while the network condition is being remedied. In one embodiment, the backup NMC can be a hot standby NMC, i.e., ready to operate immediately when it is needed.

Note that the specific types of codecs (e.g., G.711 and G.728) described above are provided only as examples and should not be deemed as limitations of the disclosure. As such, the teachings of the current disclosure can be used by broadly changing from any first codec to any second codec, wherein the second codec has a lower bandwidth usage as compared to that of the first codec, and vice versa.

Referring back to FIG. 2, the service provider may implement NWPs in CEs 264 and 294, S/BCs 262 and 292 located in the access offices 121 and 124. Similarly, the service provider may implement NMCs 266 and 296 in the access offices 121 and 124, respectively. The NMC 266 communicates with CE 264 and S/BC 262 for receiving alerts and mitigating an overload in access office 121. Similarly, the NMC 296 communicates with CE 294 and S/BC 292 for receiving alerts and mitigating an overload in the access office 124. Thus, NMCs 266 and 296 monitor the network for traffic overload by receiving alerts from the various devices that have NWPs.

In one example, the access office 121 may become overloaded following a failover from the access office 124. The NMC 266 may then receive an alert from one or more NWPs, e.g., NWPs in CE 264, S/BC 262, indicating that a predetermined threshold for bandwidth usage is either reached or exceeded.

The NMC 266 may then initiate usage of a codec with a lower bandwidth according to predetermined criteria. For example, in one embodiment the criteria may specify one or more thresholds as to when a switch to a different codec will be triggered. In fact, the criteria may specify which portions or types of the traffic, (e.g., all calls, only new calls, only existing calls, only calls to/from re-homed subscribers, and so on) is to use the codec with the lower bandwidth when a specific threshold is exceeded. For example, the NMC 266 sends a command to the NMC agent(s) 241 and 251 implemented within a MGCF to effect the change in the type of codec being used. In one example, the NMC 266 may send a command that specifies new calls will use a codec with a lower bandwidth. In another example, the NMC 266 may send a command that specifies that all calls will use a codec with a lower bandwidth, and so on.

However, if the threshold for returning to the usage of the original codec is reached, then the method may then turn-off usage of the codec with a lower bandwidth. For example, once the overload condition has passed, existing and/or new calls may then resume using the original codec that may require more bandwidth. For example, the NMC 266 may notify the NMC agent(s) to resume usage of a normal codec. In this way, the present disclosure is able to address an overload condition by selectively changing the codecs that are used to support calls.

In one embodiment, the NMC agents provide a command interface to receive and confirm receipt of commands from the NMC. For example, it can be implemented as Simple Object Access Protocol (SOAP)/Extensible Markup Language (XML) interface or other interfaces such as application programming interfaces (APIs). To illustrate, on receiving a command, "new calls use normal codec", on the following NPA (NPA-NXX) codes, the NMC agent will inform the MGC that it can resume the use of a normal call processing logic on all incoming and outgoing calls involving the specified NPA or NPA-NXX codes, e.g., with respect to the use of a normal codec.

In another example, on receiving a command, "new calls use lowest codec", on the following NPA (NPA-NXX) codes, the NMC agent will inform the MGC that when setting up a new call involving the specified NPA or NPA-NXX codes, a lowest possible codec should be used. More specifically, for a call originating by the NGN UE, the MGC should respond by choosing the lowest codec offered by the UE in the SDP portion of the SIP message, whereas for a call originated by a PSTN user, the MGC should construct an Invite Message to the called NGN UE by offering the lowest codec supported.

In yet another example, on receiving a command, "all calls use lowest codec" on the following NPA or (NPA-NXX) codes, the NMC agent will inform the MGC that when setting up a new call involving the specified NPA or NPA-NXX codes, a lowest possible codec should be used. In addition, the NMC agent will inform the MGC to initiate SIP mid call procedures to switch to the lowest possible codec for all existing calls involving the same NPA or (NPA-NXX) codes and are not using the lowest possible codec.

In one embodiment, the processes performed by the NMCs may be implemented at a centralized location, e.g., a national data center, a server office or an operation center. The NMC in a centralized location may then be responsible for monitoring and controlling traffic for the entire network. The centralized implementation is capable of providing the same functions as discussed above in the distributed implementation. However, in order to be able to handle massive calling events that may occur in some particular areas, the NMC can be implemented with mapping information that shows which NPA (or NPA-NXX) codes will be impacted if a particular NWP reports network resource issues. The mapping of the NWP to NPA or NPA-NXX codes can be provisioned via NMC configuration interfaces and can be stored within the NMC.

Figure 3:
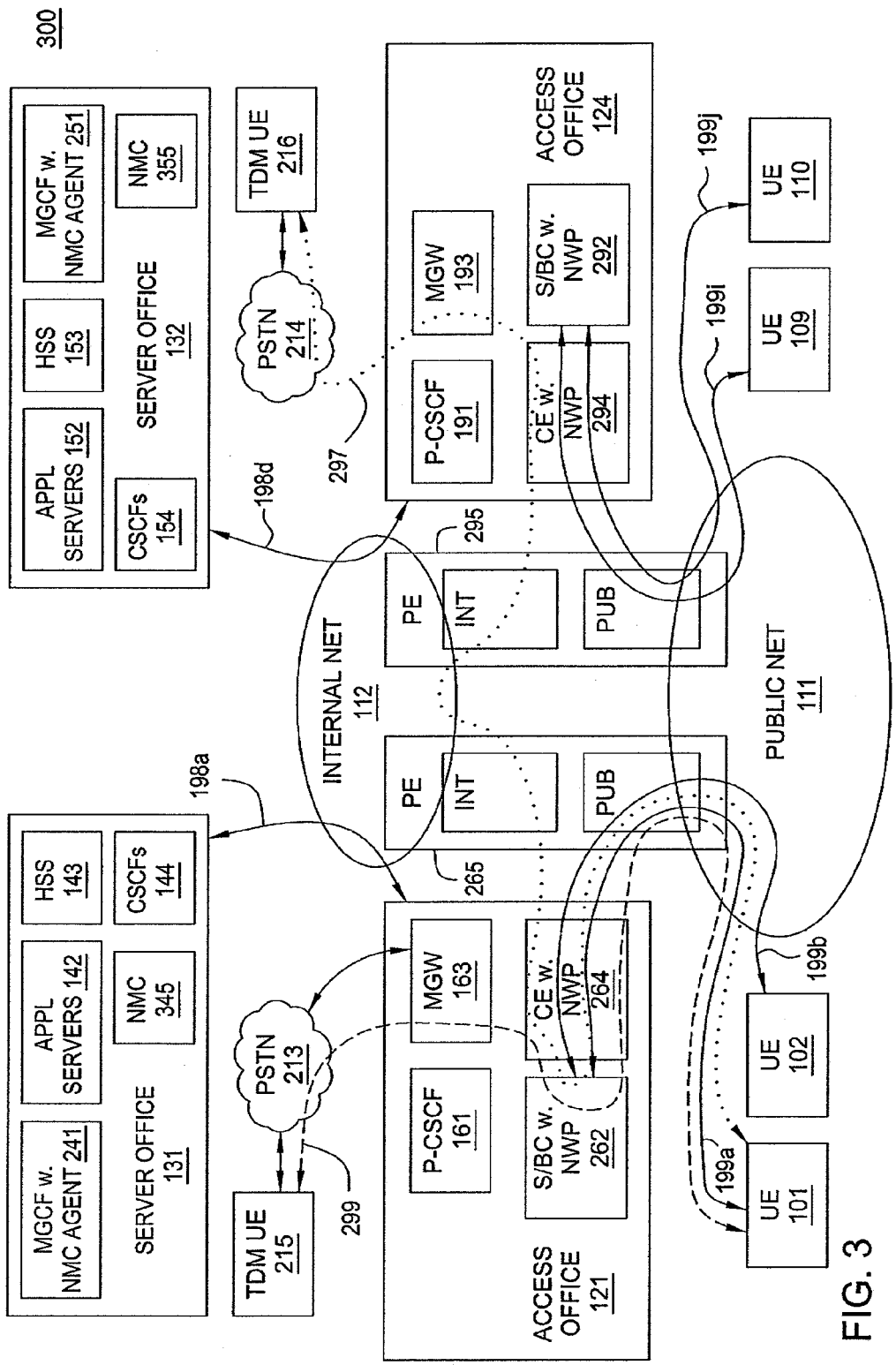
FIG. 3 illustrates an exemplary network with one embodiment of the present disclosure for mitigating an overload in a network via a centralized network monitor and controller (NMC)

FIG. 3 illustrates an exemplary network 300 for mitigating an overload in a network via centralized NMCs. The network 300 is similar to network 200 except for the fact that the NMCs are located in the server offices. As such, the descriptions of similar components in FIG. 3 to those of FIG. 2 are provided above. In one embodiment, the NMCs 345 and 355 can be deployed in the server offices 131 and 132, respectively. The NMCs 345 and 355 are responsible for the entire network. The mapping of the NWP to NPA or NPA-NXX codes may then be provisioned via NMC configuration interfaces and may be stored within the NMCs 345 and 355. If a network usage burst is detected, the centralized NMCs 345 and 355 may inform NMC agents to take action. In one embodiment, the NMC 345 is the primary NMC, whereas the NMC 355 is a backup NMC. In other words, the NMC 355 can be implemented as a redundant NMC.

In one embodiment, the NMC may generate notification or alarms to a higher level network management system when it takes measures. This will provide another level of monitoring.

Figure 4:
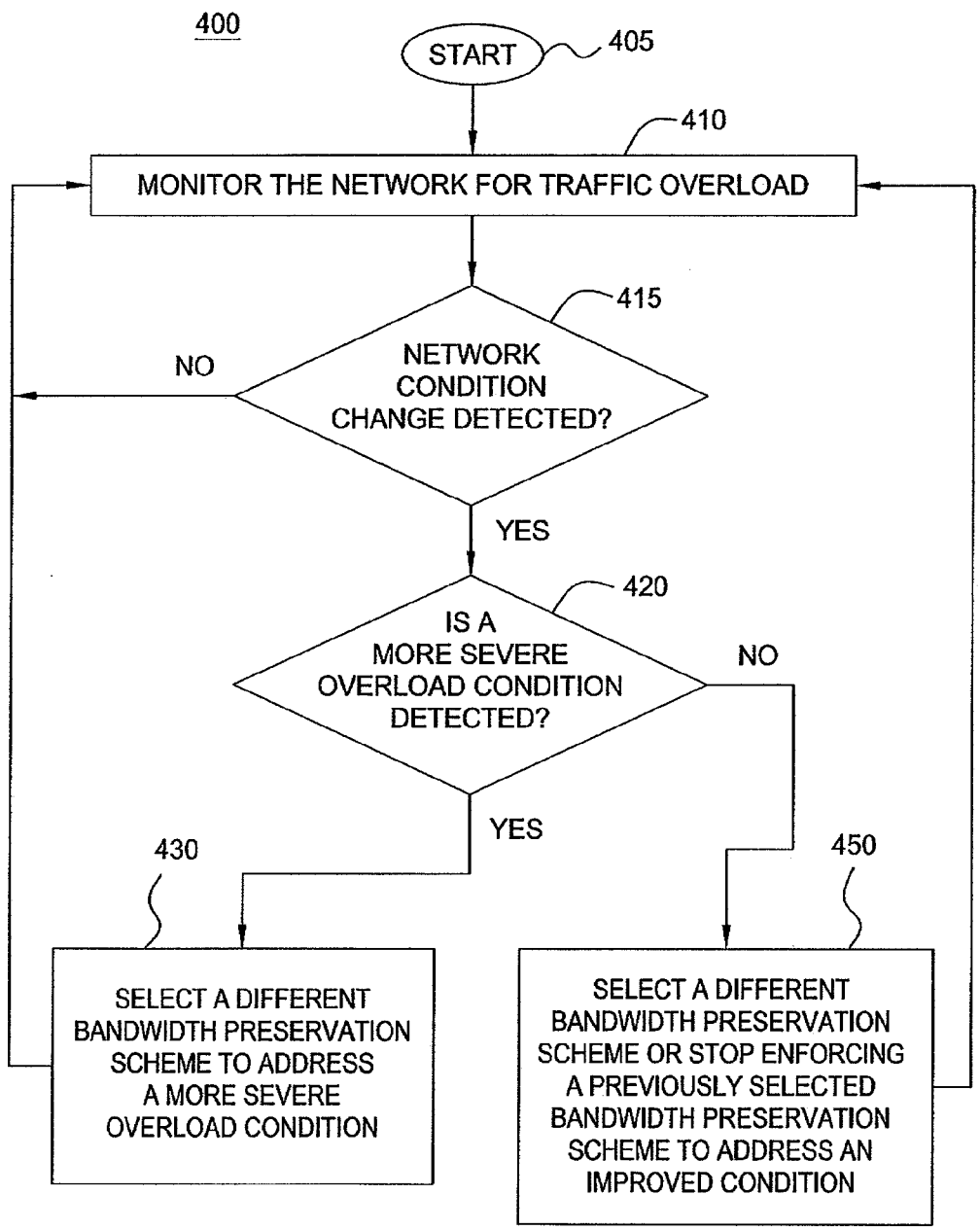
FIG. 4 illustrates a flowchart of a method for mitigating an overload in a network.

FIG. 4 illustrates a flowchart of a method 400 for mitigating an overload in a network. For example, one or more steps of method 400 can be implemented by an NMC. Method 400 starts in step 405 and proceeds to step 410.

In step 410, method 400 monitors the network for detecting traffic overload, i.e., an overload condition. For example, an NMC may monitor the network for traffic overload by receiving alerts (e.g., periodically or when a threshold is reached)

from various devices in the network that have NWPs. The method then proceeds to step 415.

In step 415, method 400 determines whether a network condition change has been detected. For example, method 400 determines whether a network condition change has been detected. If the answer is affirmative, method 400 proceeds to step 420. If the answer is negative, method 400 proceeds to step 410.

In step 420, method 400 determines if a more severe overload condition is detected. As described earlier, there may be several levels of thresholds. For example, if the previous monitoring indicated that there was no overload condition, then the previous network condition is associated with a green level. If the latest monitoring indicated that the threshold associated with yellow level is reached, then the method determines that there is a more severe overload condition in step 420. In another example, if the previous monitoring indicated there was an overload condition associated with the yellow level, and the latest monitoring indicated the threshold associated with the orange level is reached, then the method determines that there is an even more severe overload condition. In yet another example, if the previous monitoring indicated there was an overload condition associated with the orange level, and the latest monitoring indicated the threshold associated with the red level is reached, then the method determines that there is a very severe overload condition. If a more severe overload condition is detected, the method proceeds to step 430. Otherwise, the method proceeds to step 450.

In step 430, method 400 selects a different bandwidth preservation scheme to address a more severe overload condition. In one example, the method issues a command to enforce usage of a lower bandwidth codec relative to the codec currently being used for new calls (e.g., yellow threshold is reached, as described above). In one example, usage of the lower bandwidth codec is enforced for all calls (e.g., orange threshold is reached, as described above). In one example, other, more aggressive bandwidth preservation schemes may be necessary. For example, if the red threshold is reached, other methods such as throttling, blocking, etc. may have to be initiated. The method then proceeds to step 410 to continue monitoring the network.

In step 450, method 400 selects a different bandwidth preservation scheme to address the detection of a less severe overload condition. In other words, since a network overload condition change was detected in step 415 and a more severe overload condition was not detected in step 420, then the network overload condition change must be due to the detection of a less severe overload condition.

For example, if there is no overload condition, then the method may then issue a command to stop enforcing the usage of a lower bandwidth codec. Hence, the method may issue a command to stop enforcing the previously bandwidth preservation scheme. In another example, the method issues a command to stop enforcing a previously selected bandwidth preservation scheme to address an improved condition. For example, if throttling of new calls was previously implemented (e.g., at a red level), but the network overload condition has since then improved, then the method may issue a command to stop throttling, and continue to use a lower bandwidth codec (e.g., an orange level or even a yellow level). The method then proceeds to step 410 to continue monitoring the network.

Note that the criteria for determining which portion of the traffic (e.g., all calls, only new calls, only existing calls, only re-homed calls, and so on) is affected due to a command to enforce usage of a codec with a lower bandwidth is selectively determined. For example, one service provider may choose to enforce usage of a lower bandwidth codec on all calls at a lower overload condition. Another service provider, may elect to enforce the usage of a lower bandwidth codec only on new calls regardless of the severity of the overload condition.

For example, in one embodiment, if a first threshold (e.g., 75% of capacity) is reached, the method may dictate that all re-homed calls are to use a lower bandwidth codec, while other types of calls can continue to use codecs with a higher bandwidth. However, if a second threshold (e.g., 85% of capacity) is reached, the method may dictate that all new calls are to use the lower bandwidth codec as well. However, if a third threshold (e.g., 90% of capacity) is reached, the method may dictate that all existing or currently on-going calls are to use the lower bandwidth codec as well. Finally, if a fourth threshold (e.g., 95% of capacity) is reached, the method may dictate that all calls, irrespective of types, are to use the lower bandwidth codec. It should be noted that the threshold values provided in the above example is only illustrative and should not be deemed to be a limitation of the present disclosure. Furthermore, although the above example only discloses the usage of a higher bandwidth codec or a lower bandwidth codec, the teachings of the present disclosure is not so limited. In other words, there could be a plurality of codecs with varying bandwidth capabilities with more granularity than simply "higher bandwidth" or "lower bandwidth", where the NMC may dictate different types of codecs to be used depending on the traffic condition of the network.

Similarly, if conditions improve, there may be sufficient bandwidth to switch to another bandwidth preservation scheme, or to deactivate the usage of a codec with a lower bandwidth codec. The criteria for deactivation are also predetermined by the service provider. For example, if a first threshold (e.g., 86% of capacity) is reached, the method may dictate that all new calls, except for those to/from a particular NPA.NXX can use a higher bandwidth codec, while existing calls and calls to/from the particular NPA.NXX continue to use codecs with a lower bandwidth. However, if a second threshold (e.g., 81% of capacity) is reached, the method may dictate that all new calls are to use the higher bandwidth codec as well, while existing calls continue to use the lower bandwidth codec.

It should be noted that using mid-call procedure to change codec for existing calls are relatively expensive. As such, in one embodiment, when the method steps down to a lower level, it may want to avoid implementing the mid-call procedure to change codec. As long as the method allows new calls to use better or higher bandwidth codec, existing calls will eventually terminated. However, in another embodiment, in some other services, such as those NGNs that serve many long-lasting conference calls, it may be practical to use mid-call procedure to switch the codec.

It should be noted that the media gateways, S/BCs, NMCs, NWPs, and other network elements may be located in other types of offices. For example, a regional office may house these network elements and/or modules in network elements for various access offices. In addition, a PE and CE may be located within the same physical building. As such, the pairing of a CE and a PE defines the relationship between the backbone and access portions of the NGN. Therefore, the above description is not intended to limit the implementation to a specific type of office or physical structure.

It should be noted that although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision, do not necessarily require that both branches of the determining operation be practiced. In other words, one of the branches of the determining operation can be deemed as an optional step.

Figure 5:
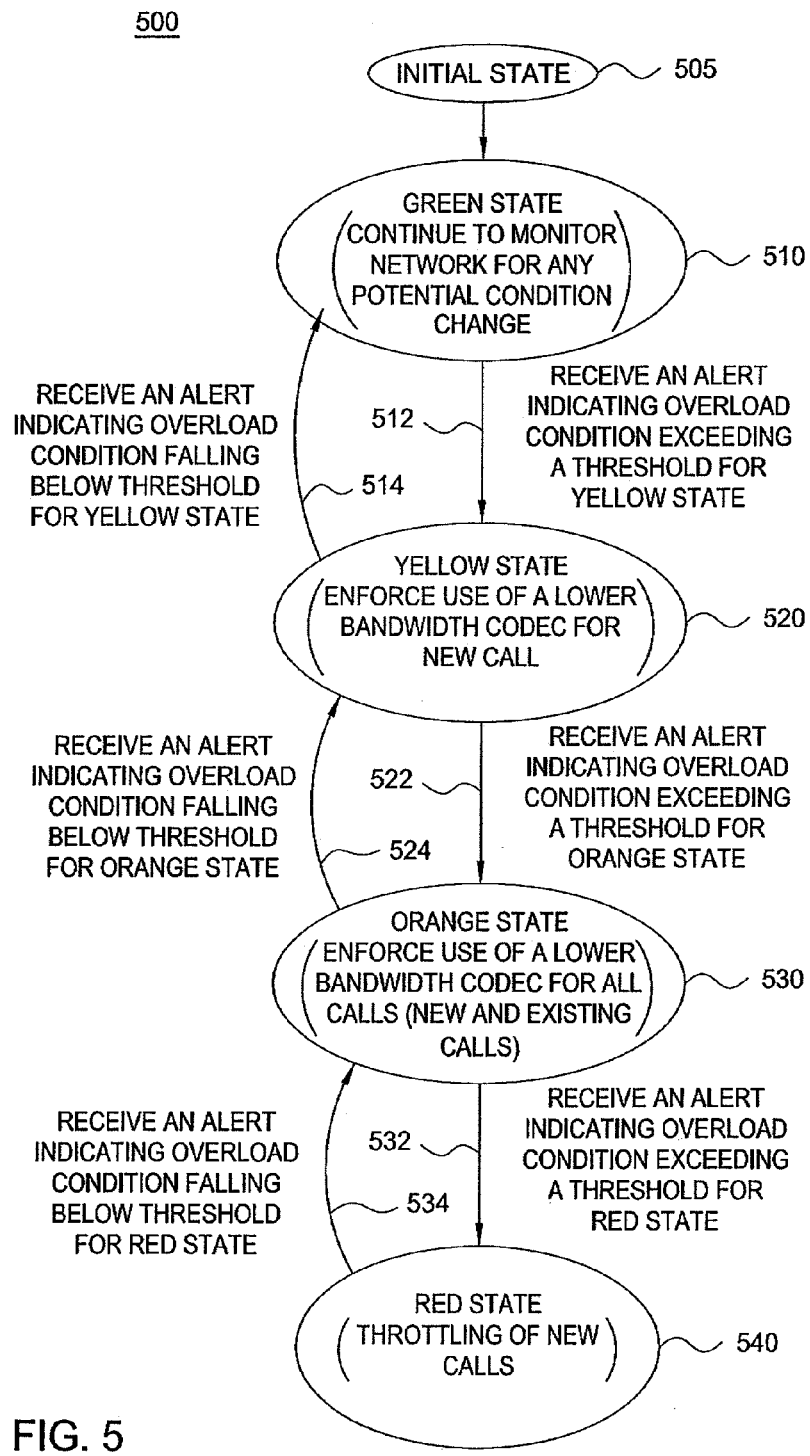
FIG. 5 illustrates a state transition diagram.

FIG. 5 illustrates a state transition diagram 500. FIG. 5 illustrates how the present method may transition from different overload condition severity levels, e.g., green, yellow, orange, and red. It should be noted that the use of various colors in this example should not be interpreted as a limitation of the present disclosure. Any manner of labeling the different overload condition severity levels is acceptable.

In one embodiment, the method starts at an initial state 505, e.g., during network setup or configuration. Once the network is operational, it will enter into the green state 510. While in the green state, the network does not enforce codec usage for any call session and continues to be monitored for any potential condition change. If a network condition change is detected, e.g., the trigger 512 where the method receives an alert indicating an overload condition exceeding a threshold for the yellow state, then it will transition into the yellow state 520.

While in the yellow state, a lower bandwidth codec is used for new calls and the network continues to be monitored for an overload condition change. If an overload condition change is detected, e.g., the trigger 522 where the method receives an alert indicating an overload condition exceeding a threshold for the orange state, then it will transition into the orange state 530. Alternatively, if an overload condition change is detected, e.g., the trigger 514 where the method receives an alert indicating an overload condition falling below a threshold for the yellow state, then it will transition into the green state.

While in the orange state, a lower bandwidth codec is used for all calls, i.e., new calls and existing calls, and the network continues to be monitored for an overload condition change. If an overload condition change is detected, e.g., the trigger 532 where the method receives an alert indicating an overload condition exceeding a threshold for the red state, then it will transition into the red state 540. Alternatively, if an overload condition change is detected, e.g., the trigger 524 where the method receives an alert indicating an overload condition falling below a threshold for the orange state, then it will transition into the yellow state.

While in the red state, throttling of new calls may be implemented, and the network continues to be monitored for an overload condition change. If an overload condition change is detected, e.g., the trigger 534 where the method receives an alert indicating an overload condition falling below a threshold for the red state, then it will transition into the orange state.

It should be noted that although the state transition diagram illustrates the transition of states as occurring in a sequential single step manner, the present disclosure is not so limited. For example, the method can be implemented where a transition may occur where it transitions from the red level directly to the yellow level or vice versa, i.e., skipping a level. Further, the method can incorporate stabilization methods to reduce the sensitivity on transient network condition changes. For example, it could wait for a certain number of a network condition change alerts to occur in a observation time window to trigger a state transition. The manner as to how the transition will occur can be tailored to the requirements of a particular network.

Figure 6:
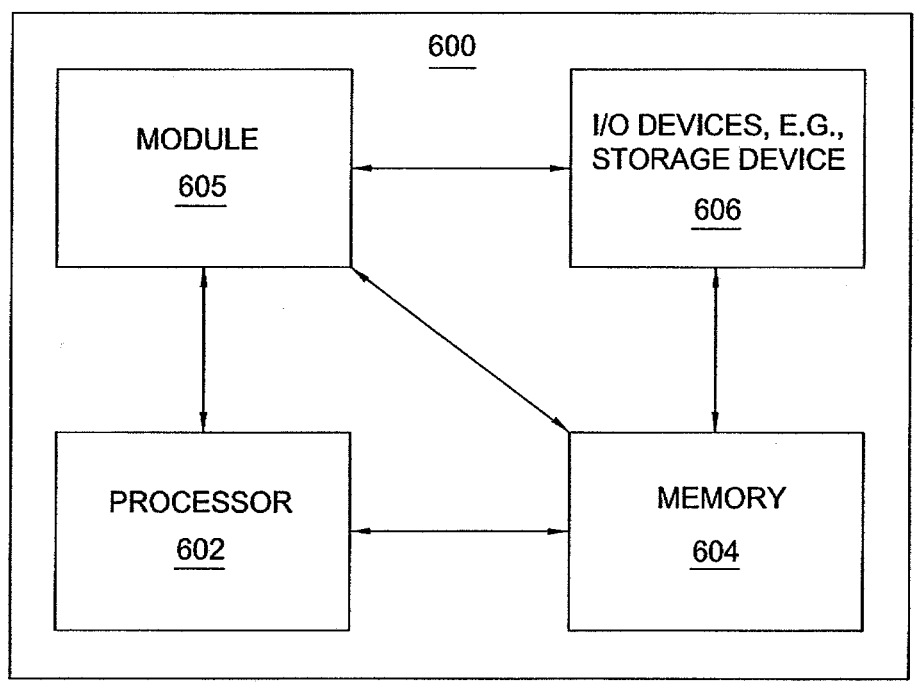
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for mitigating an overload in a network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the teachings of the present disclosure can be implemented in a combination of software and hardware, e.g., using application specific integrated circuits (ASIC), a general-purpose computer or any other hardware equivalents. In one embodiment, the present module or process 605 for mitigating an overload in a network can be loaded into memory 604 and executed by processor 602 to implement the functions as discussed above. As such, the present method 605 for mitigating an overload in a network (including associated data structures) of the present invention can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a traffic overload condition for traffic in a network, the method comprising:
    monitoring, by a processor of a network monitor, the network for the traffic overload condition;
    determining, by the processor, whether a more severe traffic overload condition or a less severe traffic overload condition is detected as compared to a previous traffic overload condition; and
    issuing, by the processor, a command to a network monitor and controller agent, wherein the command is used to select a different bandwidth preservation scheme, when the more severe traffic overload condition or the less severe traffic overload condition is detected, wherein the different bandwidth preservation scheme is based on a selection of a codec type, wherein the different bandwidth preservation scheme is applied to a portion of the traffic, wherein the portion of the traffic comprises re-homed calls.

2. The method of claim 1, wherein the determining is based on a threshold.

3. The method of claim 2, wherein the threshold is associated with an overload condition severity level.

4. The method of claim 3, wherein the overload condition severity level is associated with a particular bandwidth preservation scheme as to a manner of processing various types of traffic.

5. The method of claim 1, wherein the monitoring the network for the traffic overload condition comprises receiving an alert from a network element.

6. The method of claim 5, wherein the network element comprises a session border controller.

7. The method of claim 5, wherein the network element comprises a media gateway.

8. The method of claim 5, wherein the network element comprises a router.

9. The method of claim 5, wherein the alert is generated by a network watch point.

10. A non-transitory computer-readable medium storing a plurality of instructions which, when executed by a processor of a network monitor, cause the processor to perform operations for monitoring a traffic overload condition for traffic in a network, the operations comprising:
- monitoring the network for the traffic overload condition;
- determining whether a more severe traffic overload condition or a less severe traffic overload condition is detected as compared to a previous traffic overload condition; and
- issuing a command to a network monitor and controller agent, wherein the command is used to select a different bandwidth preservation scheme, when the more severe traffic overload condition or the less severe traffic overload condition is detected, wherein the different bandwidth preservation scheme is based on a selection of a codec type, wherein the different bandwidth preservation scheme is applied to a portion of the traffic, wherein the portion of the traffic comprises re-homed calls.

11. The non-transitory computer-readable medium of claim 10, wherein the determining is based on a threshold.

12. The non-transitory computer-readable medium of claim 11, wherein the threshold is associated with an overload condition severity level.

13. The non-transitory computer-readable medium of claim 12, wherein the overload condition severity level is associated with a particular bandwidth preservation scheme as to a manner of processing various types of traffic.

14. The non-transitory computer-readable medium of claim 10, wherein the monitoring the network for the traffic overload condition comprises receiving an alert from a network element.

15. The non-transitory computer-readable medium of claim 14, wherein the network element comprises a session border controller.

16. The non-transitory computer-readable medium of claim 14, wherein the network element comprises a media gateway.

17. The non-transitory computer-readable medium of claim 14, wherein the network element comprises a router.

18. The non-transitory computer-readable medium of claim 14, wherein the alert is generated by a network watch point.

19. An apparatus for monitoring a traffic overload condition for traffic in a network, the apparatus comprising:
- a network monitor comprising a processor; and
- a non-transitory computer-readable medium storing a plurality of instructions which, when executed by the processor, cause the processor to perform operations, the operations comprising:
  - monitoring the network for the traffic overload condition;
  - determining whether a more severe traffic overload condition or a less severe traffic overload condition is detected as compared to a previous traffic overload condition; and
  - issuing a command to a network monitor and controller agent, wherein the command is used to select a different bandwidth preservation scheme, when the more severe traffic overload condition or the less severe traffic overload condition is detected, wherein the different bandwidth preservation scheme is based on a selection of a codec type, wherein the different bandwidth preservation scheme is applied to a portion of the traffic, wherein the portion of the traffic comprises re-homed calls.

20. The apparatus of claim 19, wherein the monitoring the network for the traffic overload condition comprises receiving an alert from a network element having a network watch point.

* * * * *